(12) United States Patent
Hughes

(10) Patent No.: US 7,350,480 B1
(45) Date of Patent: Apr. 1, 2008

(54) PORTABLE ELECTRIC FENCE SYSTEMS

(76) Inventor: Gabriel T. Hughes, P.O. Box 852, Avondale, AZ (US) 85323

(*) Notice: Subject to any disclaimer, the term of this patent is extended or adjusted under 35 U.S.C. 154(b) by 0 days.

(21) Appl. No.: 11/754,758

(22) Filed: May 29, 2007

Related U.S. Application Data

(63) Continuation-in-part of application No. 10/883,953, filed on Jul. 1, 2004, now abandoned.

(60) Provisional application No. 60/484,408, filed on Jul. 2, 2003.

(51) Int. Cl.
*A01K 3/00* (2006.01)

(52) U.S. Cl. .................. 119/512; 119/518; 119/519

(58) Field of Classification Search ................ 119/484, 119/496, 498, 502, 512, 513, 516, 518, 519, 119/843; 256/10, 37, 40, 43
See application file for complete search history.

(56) References Cited

U.S. PATENT DOCUMENTS

| 3,387,825 | A | 6/1968 | Kreeger |
| 4,090,472 | A | 5/1978 | York |
| 4,250,836 | A | 2/1981 | Smith |
| 4,494,733 | A | 1/1985 | Olsson |
| 5,738,341 | A | 4/1998 | Lease |
| 6,067,940 | A | 5/2000 | Holder |
| 6,257,558 | B1 | 7/2001 | Levine et al. |
| 6,467,433 | B1 | 10/2002 | Stanton et al. |
| 6,499,435 | B2 | 12/2002 | Markham et al. |
| 6,595,496 | B1 | 7/2003 | Langlie et al. |
| 6,622,436 | B1 | 9/2003 | Kretsch |
| 6,866,252 | B2 | 3/2005 | Pulliam |

FOREIGN PATENT DOCUMENTS

EP 0534349 A2 9/1992

*Primary Examiner*—T Nguyen
(74) *Attorney, Agent, or Firm*—Stoneman Volk Patent Group; Martin L. Stoneman; Michael D. Volk, Jr.

(57) ABSTRACT

A temporary electrified fence enclosure system utilizing movable storable fence posts and flexible electrified ribbons that are retractably reeled within the fence post. Each fence post comprises an internal power source. Each electrified ribbon is coupled mechanically to other fence posts to create the enclosure. The system is preferably stored or removably attached to a trailer, such as a horse trailer, and is quickly and easily set-up.

15 Claims, 8 Drawing Sheets

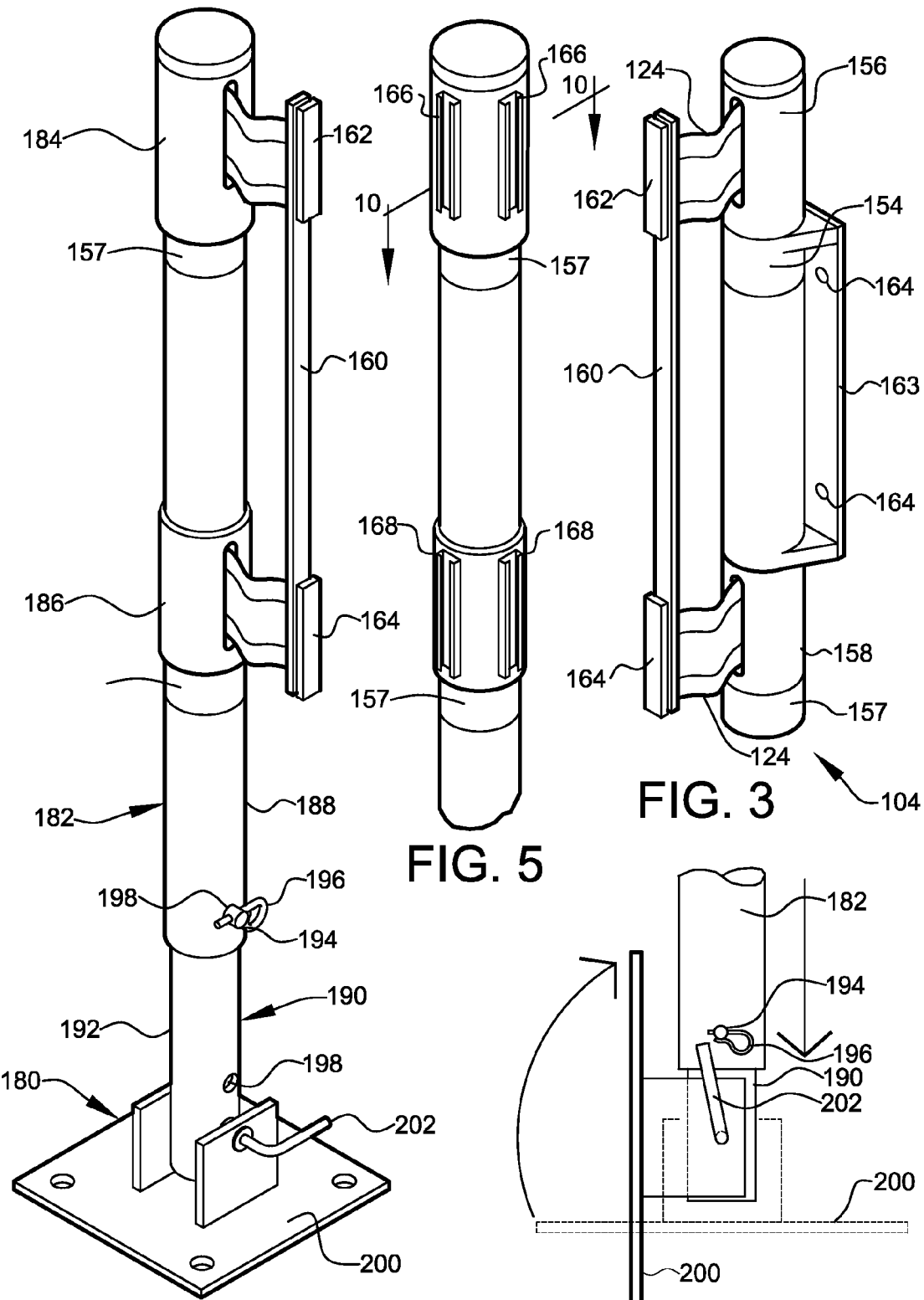

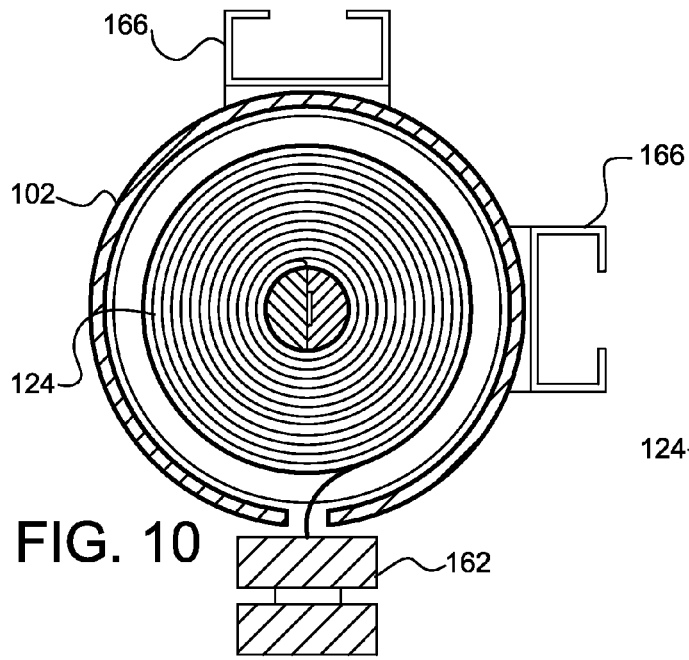
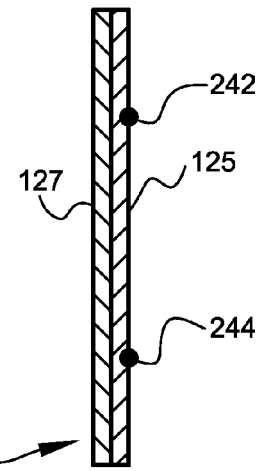
FIG. 10
FIG. 11B
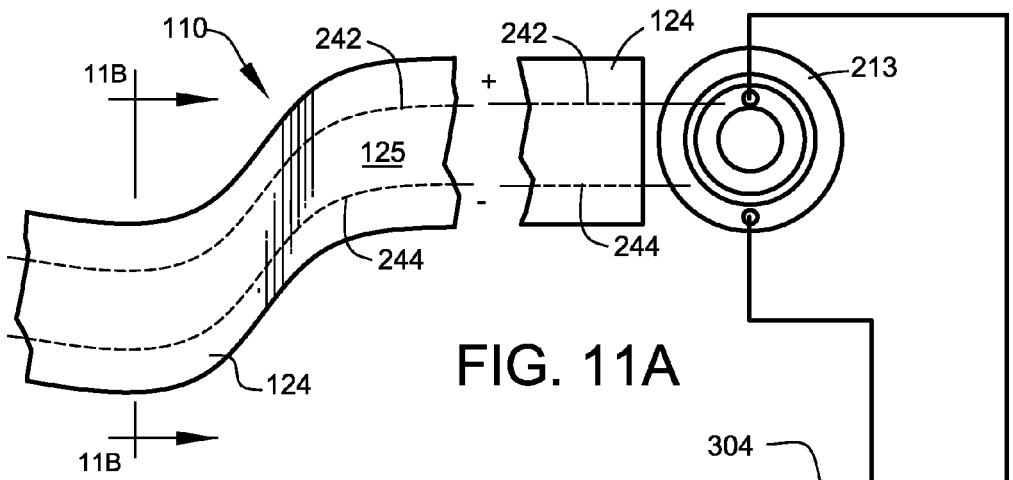
FIG. 11A
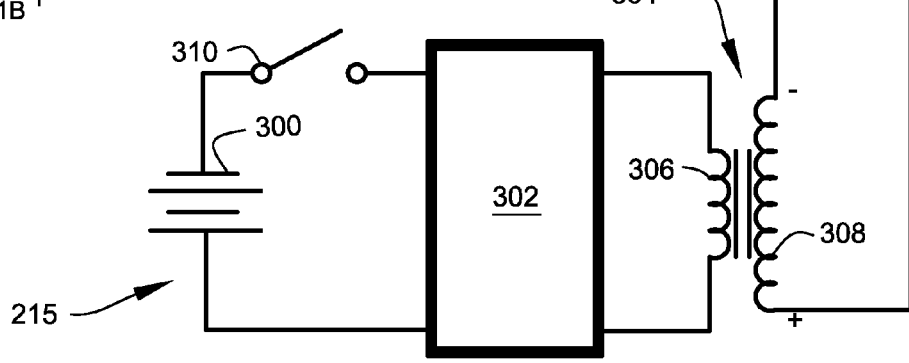

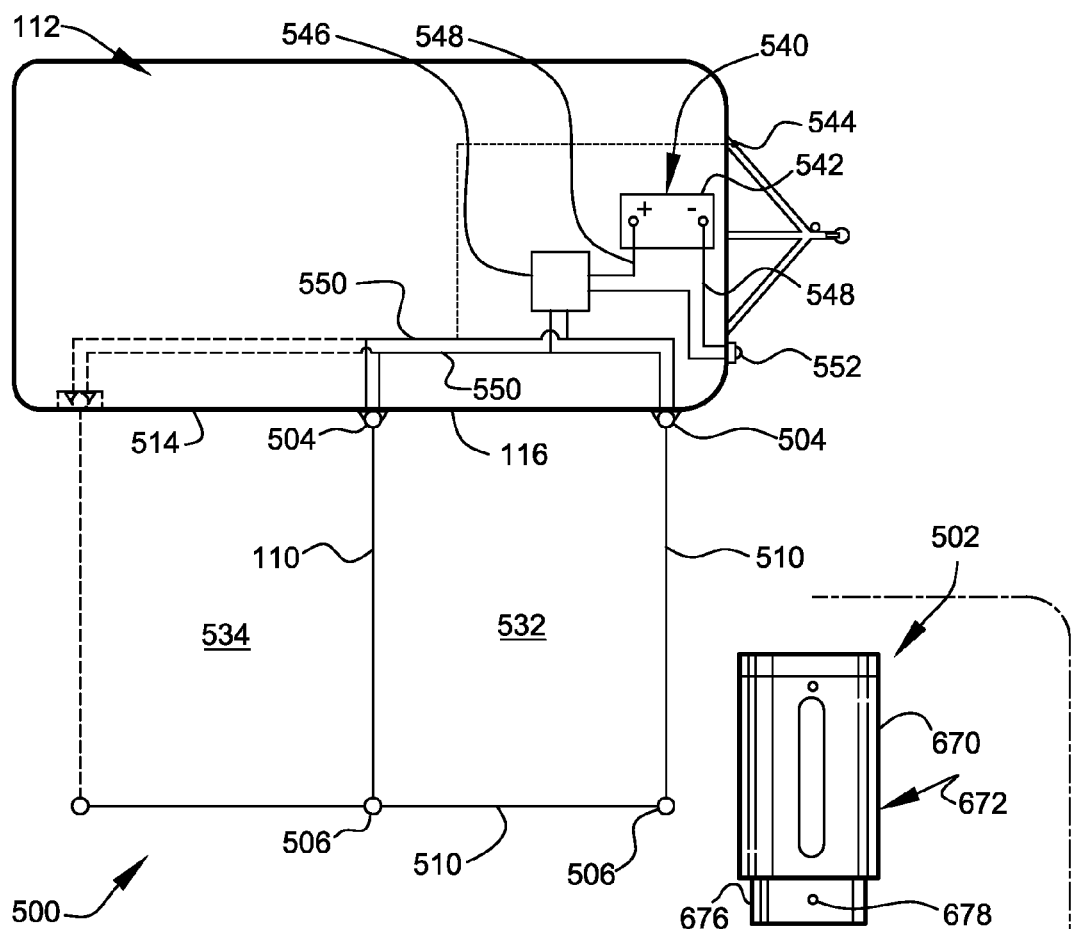
FIG. 12
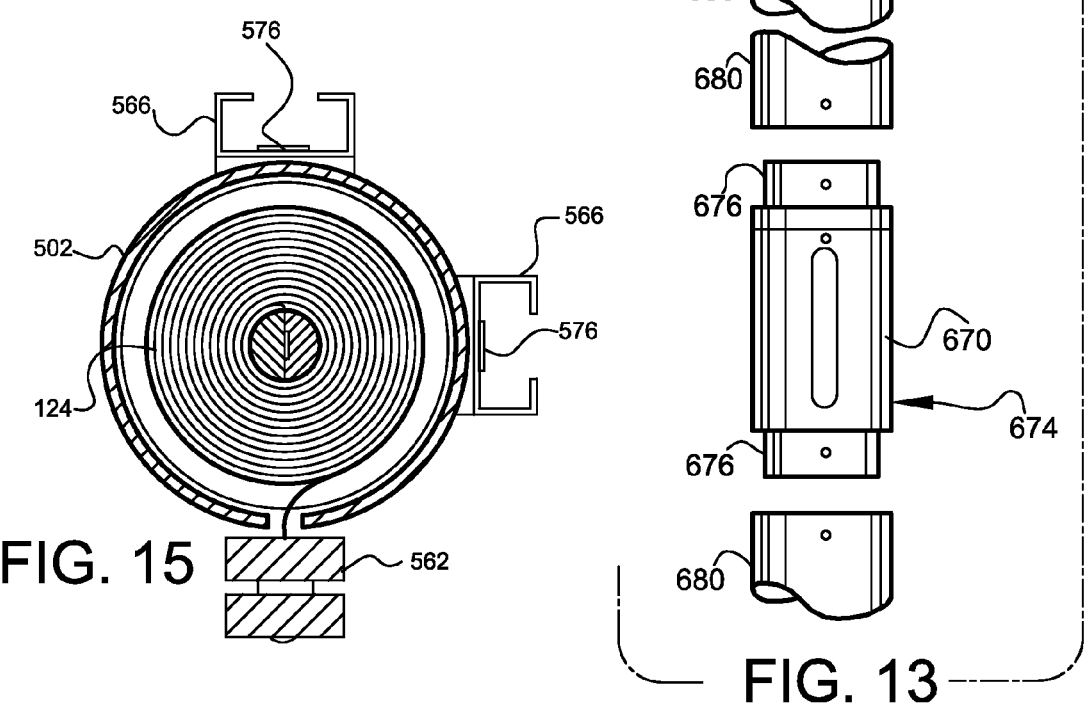
FIG. 15
FIG. 13

PORTABLE ELECTRIC FENCE SYSTEMS

CROSS-REFERENCE TO RELATED APPLICATION

The present application is a continuation-in-part of related application Ser. No. 10/883,953, filed Jul. 1, 2004, entitled "TRAILER ENCLOSURE SYSTEMS", and is related to and claims priority from that application, which is related to and claims priority from prior provisional application Ser. No. 60/484,408, filed Jul. 2, 2003, entitled "TRAILER ENCLOSURE SYSTEM", the contents of both of which are incorporated herein by this reference and are not admitted to be prior art with respect to the present invention by the mention in this cross-reference section.

BACKGROUND

This invention relates to providing systems for enclosing animals, particularly livestock, such as horses. More specifically, this invention relates to an enclosure system, attachable to a transport trailer, that may be utilized anywhere the trailer is located.

Typically, animals, such as horses, are transported by specialized trailers adapted to carry such animals. These animals are often transported to rodeos, shows, parades, etc., and require a place to be fed, exercise and sleep, most typically, a corral or stall. Typically, the livestock owner has to rent a corral or stall for the animal. Such rental can be quite costly, especially when multiplied by numerous trips throughout the years.

It would be useful to have a portable enclosure that is removably attached to a trailer for enclosing livestock after transport of such livestock. It would be useful to have such a portable enclosure that is lightweight, yet sturdy enough to keep the animal within the enclosure. Furthermore, it would be useful if such portable enclosure were to be easily transported and stowed within or adjacent to the trailer. No such portable enclosure is available.

OBJECTS AND FEATURES OF THE INVENTION

A primary object and feature of the present invention is to provide a system to overcome the above-discussed problems and to fill such needs.

It is another primary object and feature of the present invention to provide a system comprising a plurality of self-powered post members that are designed to quickly deploy a geometric arrangement of electrified boundary rails.

It is a further object and feature of the present invention to provide a system for enclosing livestock after transport of such livestock.

It is a further object and feature of the present invention to provide such a system that is lightweight, easily transported, and stowed within or adjacent to a transport vehicle.

It is a further object and feature of the present invention to provide such a system that utilizes posts coupled together with an internal power source and retractable deployable boundary member to create an enclosure.

A further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides a polygon restraint enclosure system, relating to the restraint of at least one animal within at least one temporary holding area having at least one ground surface, such system comprising: at least one deployable boundary member structured and arranged to temporarily enclose at least one open boundary of the at least one temporary holding area; at least one support post structured and arranged to assist temporary stable support of such at least one deployable boundary member above the at least one ground surface; at least one self-contained power source structured and arranged to provide at least one electric current sufficient to assist restraint of the at least one animal; wherein such at least one self-contained power source is located substantially within such at least one support post; wherein such at least one deployable boundary member comprises at least one electrical conductor structured and arranged to conduct the at least one electric current substantially along at least one deployed length of such at least one boundary member; wherein, when such at least one electrical conductor comprises at least one open circuit structured and arranged to be at least partially exposed to the at least one holding area; wherein contact between the at least one animal and such at least one electrical conductor closes such at least one open circuit passing the at least one electric current to the at least one animal; and wherein such at least one support post comprises at least one storage structured and arranged to store such at least one deployable boundary member substantially within such at least one support post when not in use.

Moreover, it provides such a polygon restraint enclosure system wherein such at least one support post is movably relocatable relative to the at least one ground surface. Additionally, it provides such a polygon restraint enclosure system wherein: such at least one electrical conductor comprises at least one substantially flexible composition; and such at least one deployable boundary member comprises at least one substantially flexible substrate structured and arranged to position such at least one electrical conductor along such at least one deployable boundary member. Also, it provides such a polygon restraint enclosure system wherein such at least one support post comprises at least one retractor reel structured and arranged to assist retractable reeling of such at least one deployable boundary member to at least one stowed position within such at least one storage.

In addition, it provides such a polygon restraint enclosure system wherein: such at least one deployable boundary member comprises at least one electrifiable ribbon comprising at least one first ribbon side and at least one second ribbon side; such at least one electrical conductor is conductively positioned to be substantially exposed on such at least one first ribbon side; and such at least one electrical conductor is conductively positioned to be substantially electrically isolated from such at least one second ribbon side. And, it provides such a polygon restraint enclosure system wherein: such at least one deployable boundary member comprises at least one first end and at least one second end; such at least one first end comprises at least one first coupler structured and arranged to electrically couple such at least one electrical conductor to such at least one self-contained power source; and such at least one second end comprises at least one second coupler structured and arranged to couple such at least one deployable boundary member to at least one attachment point.

Further, it provides such a polygon restraint enclosure system wherein such at least one first coupler comprises at least one commutator structured and arranged to maintain the electrical coupling of such at least one electrical conductor and such at least one self-contained power source during operation of such at least one retractor reel. Even further, it provides such a polygon restraint enclosure system further comprising: a plurality of such at least one support posts; wherein such at least one second coupler is structured and arranged to couple at least one first support post of such plurality to at least one second support post of such plurality. Moreover, it provides such a polygon restraint enclosure system further comprising: at least one animal transport structured and arranged to transport the at least one animal; wherein such at least one animal transport comprises at least one sidewall usable to define at least one boundary of the at least one temporary holding area.

Additionally, it provides such a polygon restraint enclosure system wherein at least one such at least one support post of such plurality comprises at least one wall mount structured and arranged to mount such at least one support post to such at least one sidewall. Also, it provides such a polygon restraint enclosure system wherein such at least one animal transport comprises at least one secondary power source structured and arranged to power at least one electrical conductor of at least one such at least one support post of such plurality. In addition, it provides such a polygon restraint enclosure system wherein such at least one animal transport comprises at least one carrier structured and arranged to carry such plurality of such at least one support posts when not in use. And, it provides such a polygon restraint enclosure system wherein such at least one electrifiable ribbon comprises at least one first such at least one electrical conductor and at least one second such at least one electrical conductor. Further, it provides such a polygon restraint enclosure system wherein: such at least one first such at least one electrical conductor and such at least one second such at least one electrical conductor are electrically isolated; such at least one first such at least one electrical conductor is coupled to at least one positive electrical potential of such at least one self-contained power source; and such at least one second such at least one electrical conductor is coupled to at least one negative electrical potential of such at least one self-contained power source.

In accordance with another preferred embodiment hereof, this invention provides a polygon restraint enclosure system, relating to restraining at least one animal within at least one enclosure having a plurality of enclosure sides, after being transported by at least one animal transport having at least one sidewall, comprising: at least one animal transport structured and arranged to transport the at least one animal deployable from such at least one animal transport, at least one polygon fence, having a plurality of electrifiable sides, structured and arranged to restrain the at least one animal; and at least one power source structured and arranged to provide a sufficiently high voltage to such electrifiable sides for assisting restraint of the at least one animal; wherein such at least one power source comprises at least one conductor structured and arranged to transmit such voltage; wherein such at least one conductor comprises at least one ribbon portion; and wherein such at least one of such plurality of electrifiable sides of such at least one polygon fence are structured and arranged to abut at least one sidewall of such at least one animal transport; wherein such at least one polygon fence comprises at least one post structured and arranged to assist stable support of such plurality of electrifiable sides; and wherein such at least one post comprises at least one reel structured and arranged to assist retractable storing of such at least one conductor inside at least one portion of such at least one post.

Even further, it provides such a polygon restraint enclosure system wherein such at least one power source is located substantially within such at least one animal transport. Even further, it provides such a polygon restraint enclosure system wherein such at least one animal transport comprises at least one carrier structured and arranged to carry such at least one polygon fence when not in use.

Even further, it provides such a polygon restraint enclosure system wherein such at least one power source comprises at least one battery-powered direct-current circuit structured and arranged to generate at least one high-voltage low-amperage current.

In accordance with another preferred embodiment hereof, this invention provides a temporary deterrence system, relating to the formation of at least one temporary electrifiable fence comprising: at least one electrifiable ribbon structured and arranged to form at least one substantially horizontal line of deterrence; at least one portable post structured and arranged to assist stable support of such at least one electrifiable ribbon; wherein such at least one portable post comprises at least one reel structured and arranged to assist retractable storing of such at least one electrifiable ribbon substantially within such at least one portable post, and electrically coupled to such at least one electrifiable ribbon, at least one self-contained power source structured and arranged to supply at least one electric current to such at least one electrifiable ribbon.

Even further, it provides such a temporary deterrence system wherein such at least one portable post further comprises: at least one first portable post; and at least one second portable post; wherein such at least one electrifiable ribbon of such at least one first portable post comprises at least one coupler structured and arranged to couple such at least one electrifiable ribbon to such at least one second portable post.

BRIEF DESCRIPTION OF THE DRAWINGS

FIG. 3 shows a perspective view of a wall mount post of the trailer enclosure system of FIG. 1.

FIG. 4 shows a perspective view of a floor-mount post of the trailer enclosure system of FIG. 1.

FIG. 5 shows another partial perspective view of the floor-mount post of FIG. 4.

FIG. 6 shows a partial side view of the swivel-base mechanism of the floor-mount post of FIG. 4.

FIG. 10 shows a sectional view through the section 10-10 of FIG. 5.

FIG. 11A shows a schematic diagram of the deployable boundary member and power circuit according to the trailer enclosure system of FIG. 1.

FIG. 11B shows a sectional view through the section 11B-11B of FIG. 11A.

FIG. 12 shows a diagrammatic top view of an alternate trailer enclosure system according to a preferred embodiment of the present invention.

FIG. 13 shows a side view, partially in section, of an alternate post assembly according to the preferred embodiment of FIG. 12.

FIG. 15 shows a sectional view through the section 15-15 of FIG. 14.

DETAILED DESCRIPTION OF THE BEST MODES AND PREFERRED EMBODIMENTS OF THE INVENTION

Figure 1:
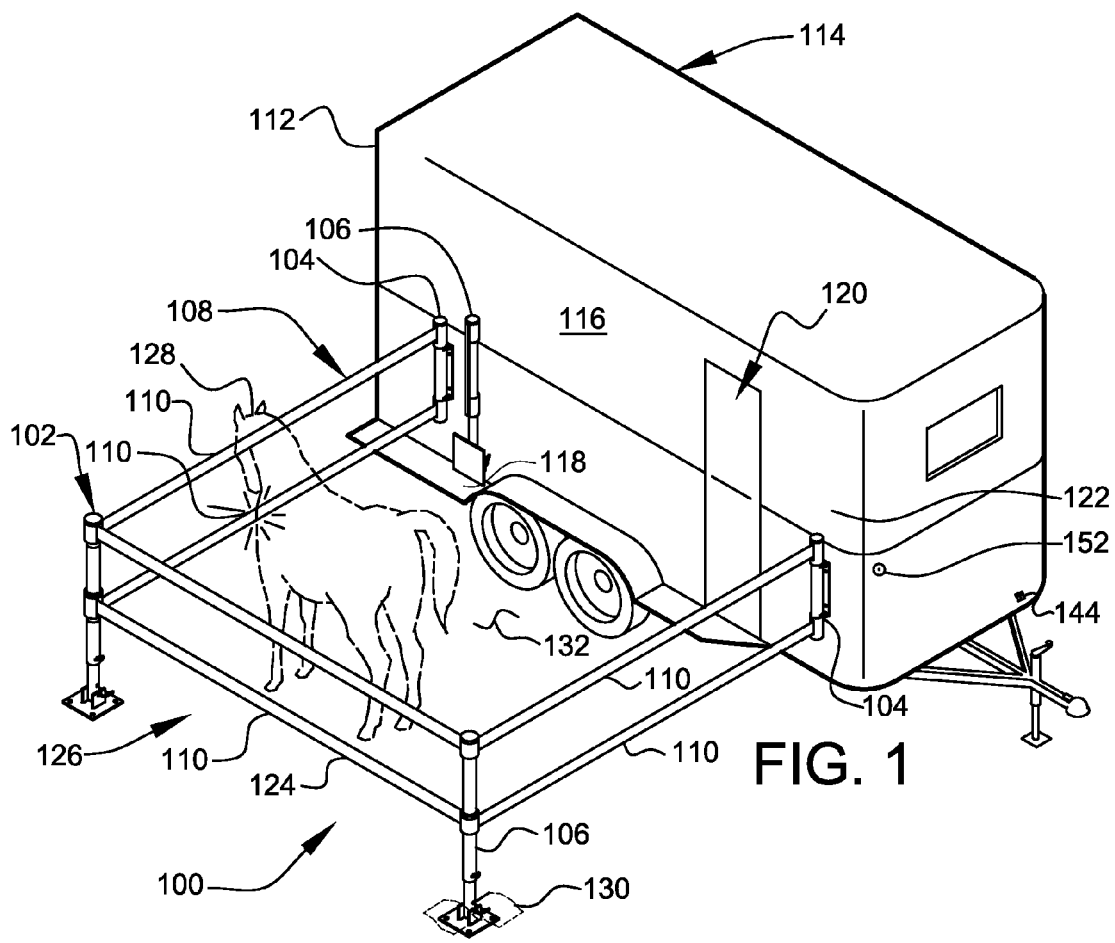
FIG. 1 shows a perspective view of the trailer enclosure system according to a preferred embodiment of the present invention.

FIG. 1 shows a perspective view of the trailer enclosure system 100 according to a preferred embodiment of the present invention. Preferably, the trailer enclosure system 100 comprises a set of electric post assemblies 102 (at least embodying herein polygon fence means, having a plurality of electrifiable sides, for restraining the at least one animal; and at least embodying herein at least one polygon fence, having a plurality of electrifiable sides, structured and arranged to restrain the at least one animal) preferably including wall mount posts 104, floor-mount posts 106 and interconnecting rails 108, most preferably deployable boundary members 110, as shown. Preferably, each post comprises at least one internal power source functioning to electrify deployable boundary members 110. Preferably, the wall mount posts 104 are attached to one sidewall 116 of a trailer 112 (this arrangement at least embodies herein wherein such at least one of such plurality of electrifiable sides of such polygon fence means are structured and arranged to abut the at least one sidewall; and it at least embodies herein wherein such at least one of such plurality of electrifiable sides of such at least one polygon fence are structured and arranged to abut the at least one sidewall), such as the horse trailer 114 illustrated in FIG. 1. Preferably, such horse trailers 114 are fully enclosed or have at least four sides, as shown (at least embodying herein animal transport means, having at least one sidewall, for transporting the at least one animal; and at least embodying herein at least one animal transport, having at least one sidewall for transporting the at least one animal). Preferably, additional floor-mount posts 106 are stored on the trailer sidewall 116, preferably adjacent the wall-mount posts 104 near a fender portion 118, as shown. Most preferably, all the electric post assemblies 102 are stored along the trailer sidewall when not in use. In an alternate preferred embodiment, the electric post assemblies 102 are stored in one or more storage pockets 120 (at least embodying herein wherein such animal transport means comprises carrying means for carrying such polygon fence means and such power means; and at least embodying herein wherein such at least one animal transport comprises at least one carrier adapted to carry such at least one polygon fence and such at least one power source) with access from the exterior 122 of the sidewall 116, as shown. Preferably, the storage pocket 120 and electric post assemblies 102 are provided as original manufacturer's equipment with the trailer 112.

In another preferred embodiment, the electric post assemblies 102 are supplied as an after-market item. Upon reading the teachings of this specification, those with ordinary skill in the art will now understand that, under appropriate circumstances, considering such issues as user preference, manufacturing parameters and economic considerations, other methods of storing the electric post assemblies, such as inside the trailer or in a separate compartment outside the trailer, etc., may suffice.

Figure 2:
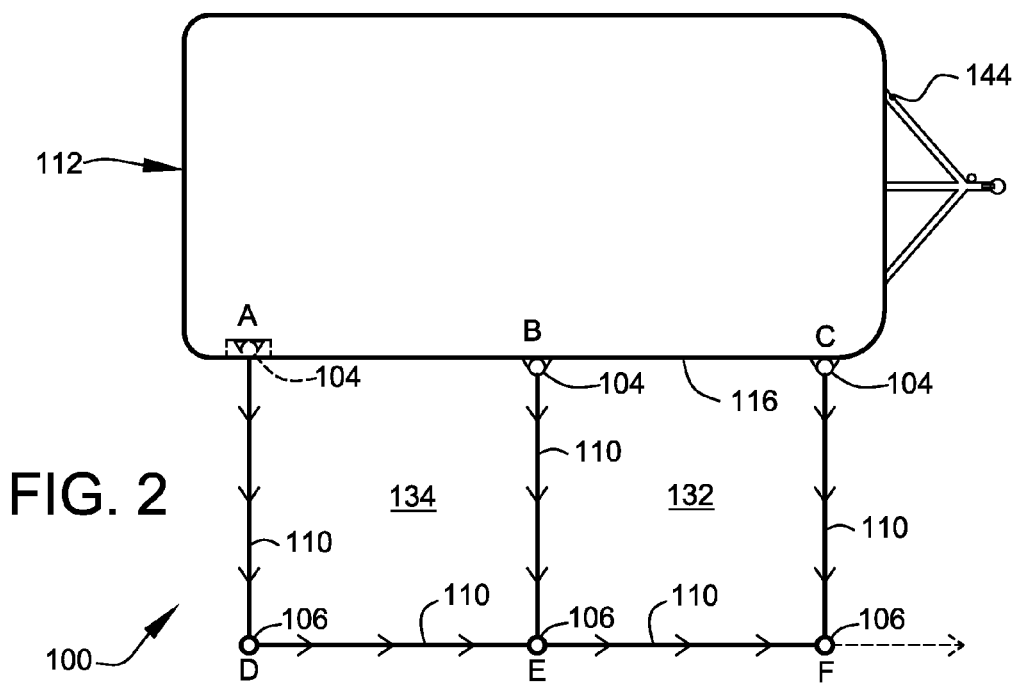
FIG. 2 shows a diagrammatic top view of the trailer enclosure system of FIG. 1.

FIG. 2 shows a diagrammatic top view of the trailer enclosure system 100 of FIG. 1. FIG. 3 shows a perspective view of a wall mount post 104 of the trailer enclosure system of FIG. 1. FIG. 4 shows a perspective view of a floor-mount post 106 of the trailer enclosure system 100 of FIG. 1. FIG. 5 shows another perspective view, partially in section, of the floor-mount post 106 of FIG. 4.

Preferably, each of the deployable boundary members 110 comprise an electrified ribbon 124 that is preferably of sufficient flexibility to allow the ribbon to be wound-up or rolled (see also the disclosure of FIG. 11A and FIG. 11B). Preferably, the retractable electrified ribbon 124 is stored internally within the electric post assemblies 102, as shown. More specifically, each post assembly 102 preferably comprises a set of retractable electrified ribbons 124, preferably stored within one or more portions of the post assembly 102 when not in use, as shown (at least embodying herein wherein such at least one support post comprises at least one storage structured and arranged to store such at least one deployable boundary member substantially within such at least one support post when not in use). Preferably, each electrified ribbon 124 comprises an electrified side 125 and a safety-side 127 (that is not electrified, as best illustrated in FIG. 11A). The non-electrified safety-side 127 is preferably facing outward from the temporary holding area 126 to protect passers-by. The electrified side 125 is preferably facing inward toward the temporary holding area 126 to keep the animals (horse 128) within the enclosure.

Preferably, each post assembly 102 comprises at least one self-contained power source structured and arranged to provide a level of electric current sufficient to assist restraint of the animal (horse 128). Preferably, such electric current is coupled to conductive elements extending along the electrified side 125 of the electrified ribbon 124 (as best illustrated in FIG. 11A).

Preferably, the deployable boundary members 110 are structured and arranged to enclose temporarily at least one open boundary, most preferably, each open boundary of the temporary holding area 126, as shown. Preferably, the deployable boundary members 110 of the electric post assemblies 102 can be interconnected to create temporary holding area 126, as shown. As illustrated in FIG. 1, temporary holding area 126 defines an enclosed area 132 for the horse 128. Preferably, this area 132 may be expanded or, as shown in FIG. 2, divided into multiple areas identified herein as area 132 and area 134. Most preferably, the temporary holding area 126 is about as wide as the trailer 112 is long with the depth of the enclosure adjusted for the animal(s) kept within it. Upon reading the teachings of this specification, those with ordinary skill in the art will now understand that, under appropriate circumstances, considering such issues as economics, user preference, animal to be enclosed, dimensions of the temporary holding area 126, etc., other animals, such as cattle, other enclosure dimensions, etc., may suffice.

In the preferred arrangement illustrated in FIG. 2, area 132 and area 134 are developed by the following deployments of electrified ribbons 124. Preferably, a set of electrified ribbons 124 of wall mount post 104 (located at position A) are extended to floor-mount post 106 at position D. Preferably, a set of electrified ribbons 124 of wall mount post 104 (at position B) are extended to floor-mount post 106 at position E. Similarly, a set of electrified ribbons 124 of wall mount post 104 (at position C) are preferably extended to floor-mount post 106 at position F, as shown. To fully enclose area 134, a set of electrified ribbons 124 of floor-mount post 106 (at position D) are extended to floor-mount post 106 at position E, as shown. Similarly, to fully enclose area 132, a set of electrified ribbons 124 of floor-mount post 106 (at position E) are extended to floor-mount post 106 at position F, as shown. Note that additional enclosed areas can preferably be developed through the use of additional floor-mount posts 106.

Preferably, the electric post assemblies 102 are secured such that the temporary holding area 126 will adequately restrain the horse 128 (or animal) within it. Preferably, the wall mount posts 104 are permanently attached to the trailer sidewall 116, as shown. Preferably, the floor-mount posts 106 are movably relocatable relative to the ground surface 101 of temporary holding area 126, as shown. More specifically, the electric post assemblies 102 are not permanently fixed to ground surface 101, thus allowing a temporary holding area 126 of flexible size and shape to be developed adjacent the trailer sidewall 116, as shown. Preferably, the floor-mount posts 106 are temporarily held to the ground surface 101 (asphalt, dirt, etc.) by weights, such as sandbags 130. Upon reading the teachings of this specification, those with ordinary skill in the art will now understand that, under appropriate circumstances, considering such issues as floor composition, weight limitations (such as anticipated animal resistance on the interconnecting ribbons), etc., other methods of temporarily attaching the electric post assemblies, such as spikes or bolts, etc., may suffice.

Preferably, the wall mount post 104 comprises a base 154 comprising an upper electrified-ribbon reel portion 156, a lower electrified-ribbon reel portion 158 (at least embodying herein wherein such polygon fence means further comprises reel means for assisting retractable storing of such conductor means; and at least embodying herein wherein such at least one polygon fence further comprises at least one reel structured and arranged to assist retractable storing of such at least one conductor) and a coupling bar 160, as best shown in FIG. 4. Preferably, coupling bar 160 connects the second ends of the two electrified ribbon reel portions 156 and 158, when the electrified ribbons 124 are installed, as shown. Preferably, at least one of the electrified ribbon reel portions (156 or 158) comprises an electric power compartment 157, as shown. Preferably, the electric power compartment 157 functions to contain the operational power components including batteries and voltage-boosting circuits of the post.

Figure 8A:
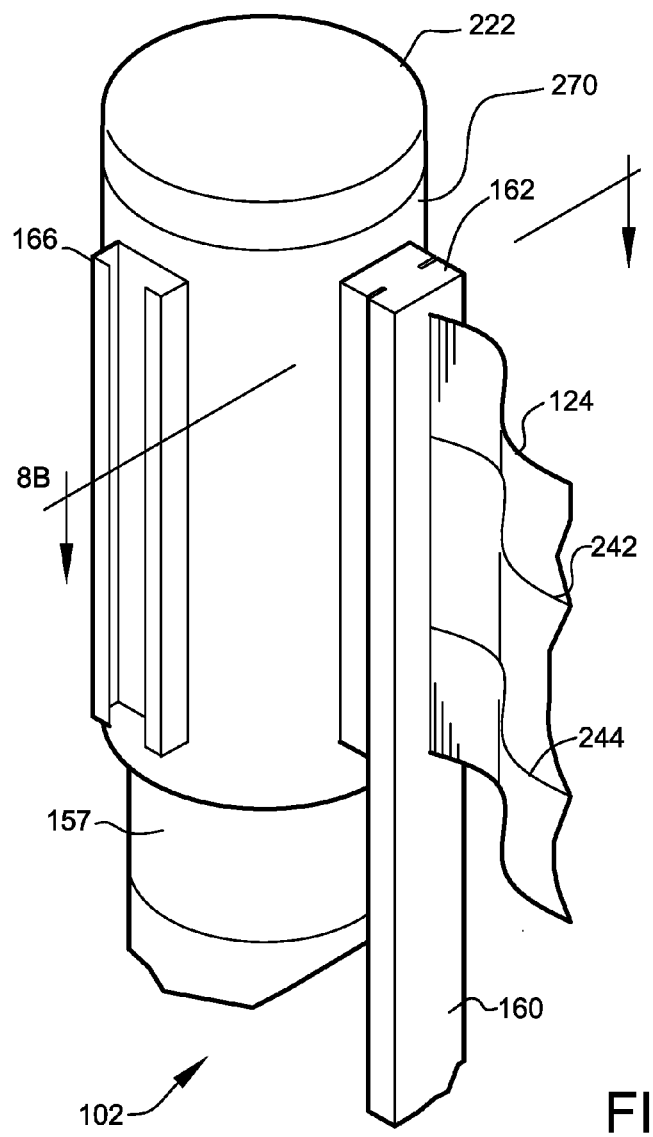
FIG. 8A shows a partial perspective view, of a post-assembly-to-post-assembly coupling according to a preferred embodiment of the present invention.
Figure 8B:
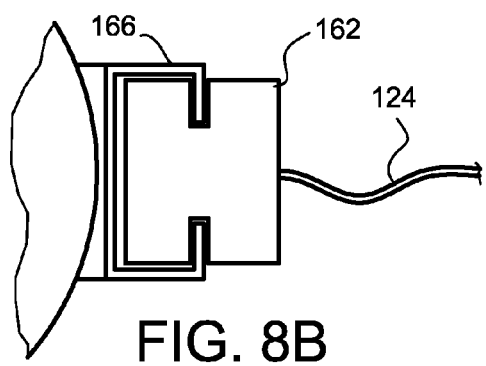
FIG. 8B shows a sectional view through the section 9-9 of FIG. 8A.

Preferably, the base 154 further comprises at least one mounting plate 163, as shown. Preferably, the mounting plate 163 comprises multiple apertures 164 for assisting the use of mounting the wall mount post 104 to the trailer sidewall 116, as shown. Upon reading the teachings of this specification, those with ordinary skill in the art will easily ascertain such mounting installation on the trailer sidewall 116. Preferably, the coupling bar 160 assists a user in pulling out the retractable electrified ribbon 124 and in coupling the retractable electrified ribbon 124 to another post assembly 102 (this arrangement at least embodying herein wherein such at least one first post comprises at least one first coupler adapted to couple such at least one electrified fence rail portion to such at least one second post). Preferably, the coupling bar 160 comprises an upper tab 162 and a lower tab 164 which will slidably fit into preferably-matching upper receiving coupling slot 166 and lower receiving coupling slot 168, preferably located on the floor-mount posts 106, as best shown in FIG. 8A and FIG. 8B. FIG. 10 shows a sectional view through the section 10-10 of FIG. 5 further illustrating the preferred coupling arrangements.

In such manner, as described above, multiple post assemblies may be connected to form an enclosure and to provide a deployable boundary member 110 between each post assembly 102 (at least embodying herein wherein such at least one second end of such at least one deployable boundary member comprises at least one second coupler structured and arranged to couple such at least one deployable boundary member to at least one attachment point). Upon reading the teachings of this specification, those with ordinary skill in the art will now understand that, under appropriate circumstances, considering such issues as enclosure height and animal size, etc., more or less than two electrified ribbon portions, etc., may suffice.

The floor-mount posts 106, as best illustrated in FIG. 4 and FIG. 5, preferably comprise a base portion 180 and a pole assembly 182, preferably removably attached to the base portion 180, as shown. Preferably, the pole assembly 182 comprises an upper electrified ribbon reel portion 184 and a lower electrified ribbon reel portion 186, one coupling bar 160, two sets of upper receiving slots 166 and two sets of lower receiving slots 168 (see FIG. 5), as shown. In addition, at least one of the electrified ribbon reel portions (184 or 186) comprises an electric power compartment 157, as shown. Preferably, the electric power compartment 157 functions to contain the operational power components including batteries and "shocking" circuits of the post. Upon reading the teachings of this specification, those of ordinary skill in the art will now understand that, under appropriate circumstances, considering such issues as intended use, cost, etc., alternate power arrangements, such as providing a single internal power source to energize both ribbons, supplying non-electric ribbons, utilizing alternate deterrent methods such as sound, ribbon surface treatments (points or spikes), etc., may suffice.

Preferably, the pole assembly 182 is adjustably attached to the base portion 180, as shown. Preferably, the pole assembly 182 comprises a hollow pipe portion 188 such that a spacer 190 having a smaller diameter pipe portion 192 may be slipped inside the hollow pipe portion 188 and secured, preferably using a locking pin 194 and cotter-pin 196 arrangement (through aligned apertures 198), as shown. Preferably, the spacer 190 has several apertures 198 to allow an adjustable height for the floor-mount post 106. Upon reading the teachings of this specification, those with ordinary skill in the art will now understand that, under appropriate circumstances, considering such issues as user preference, manufacturing and economical considerations, etc., other methods of adjusting the height of the floor-mount post 106, such as center post or top post spacing members, etc., may suffice.

FIG. 6 shows a side view, partially in section, of the swivel base 200 mechanism of the floor-mount post 106 of FIG. 4. Preferably, the base portion comprises a swivel base 200, as shown. Preferably, the swivel base 200 connects to the pole assembly 182 or the spacer 190, as shown. Preferably, the swivel base 200 can be tightened to the pole assembly 182 with a tightening bolt 202 such that the pole assembly 182 will remain vertical and sturdy. Upon reading the teachings of this specification, those with ordinary skill in the art will now understand that, under appropriate circumstances, considering such issues as economics and design preferences, etc., other methods of connecting the swivel base to the pole assembly, such as locking nuts and bolts, etc., may suffice.

Preferably, the tightening bolt 202 is loosened and the swivel base 200 can be swung in parallel to the pole assembly 182, more compactly storing it along the trailer sidewall 116 as previously discussed and as shown.

Figure 7:
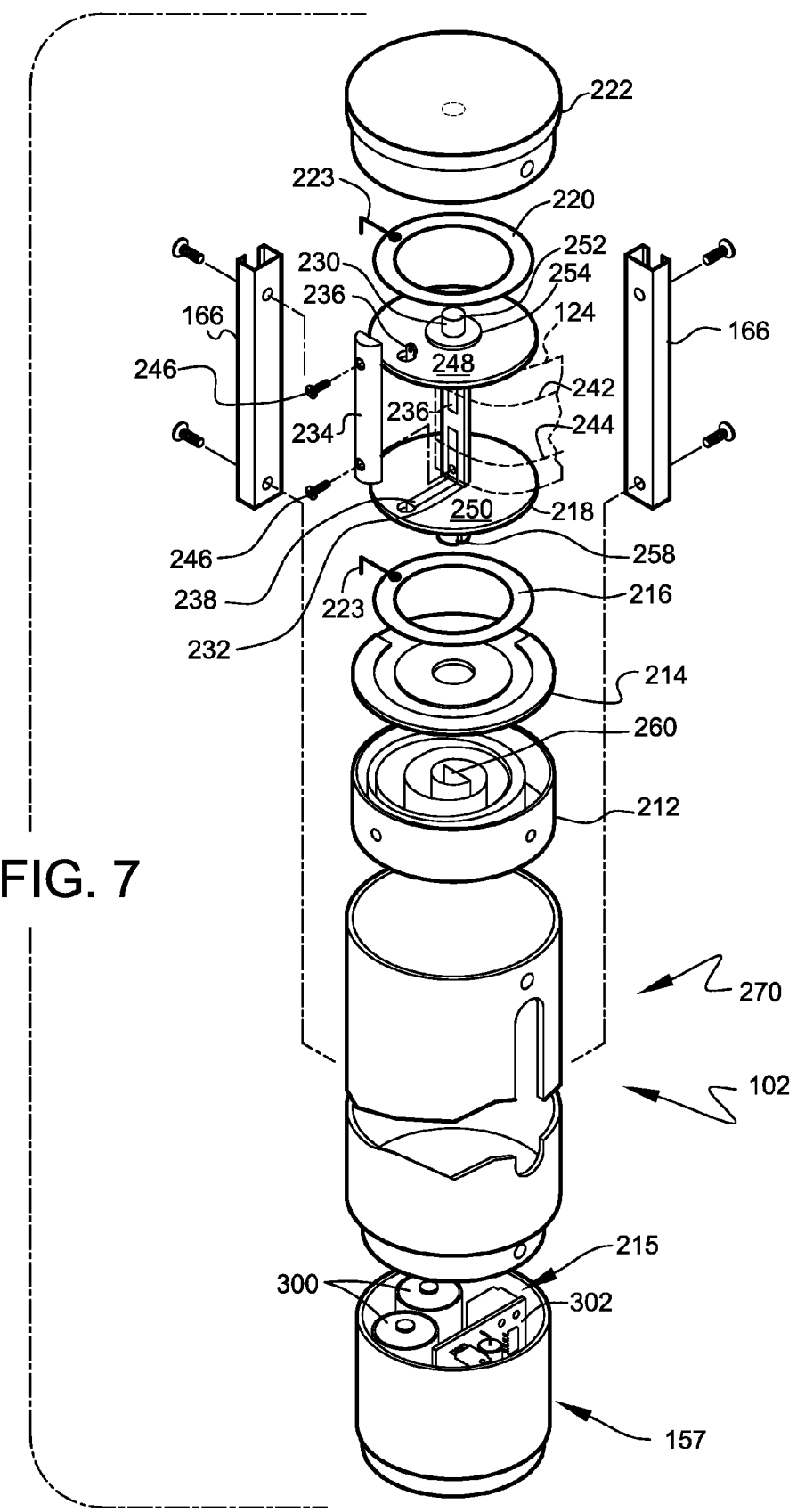
FIG. 7 shows an exploded perspective view, partially in section, of the electrified ribbon-rail reel system of the post assemblies of FIG. 3 and FIG. 4 according to a preferred embodiment of the present invention.

FIG. 7 shows a partial exploded perspective view of a representative preferred electrified-ribbon reel portion, generally identified herein as electrified ribbon reel system 210. Preferably, electrified ribbon reel system 210 illustrates preferred functional components of upper electrified ribbon reel portions 156 and lower electrified ribbon reel portions 158 (and generally conform to the preferred internal component arrangements of upper electrified ribbon reel portion 184 and lower electrified ribbon reel portion 186). Preferably, the retractable electrified ribbon reel system 210 is situate within the electric post assemblies 102 as discussed above (at least embodying herein wherein such reel means comprises post means for assisting stable support of such plurality of electrifiable sides and at least embodying herein wherein such at least one reel comprises at least one post structured and arranged to assist stable support of such plurality of electrifiable sides). Preferably, the retractable electrified ribbon reel system 210 comprises a spring mechanism 212, a combined spring and stator retainer 214, a first stator 216, a reel assembly 218, a second stator 220, and a cap 222, as shown. Preferably, the first stator 216, reel assembly 218, and second stator 220 form a commutator assembly 213 functioning to maintain an electrical coupling between the electrified ribbon 124 and a self-contained power source 215 during operation (rotation) of the reel assembly 218.

To understand the preferred operation of the retractable electrified ribbon reel system 210, it is helpful to first review the preferred construction of the electrified ribbons 124. Reference is now made to FIG. 11A and FIG. 11B. FIG. 11A shows a perspective view of the deployable boundary member 110 of FIG. 1 and FIG. 11B shows a sectional view through the section 11B-11B of FIG. 11A. Preferably, each electrified ribbon 124 comprises a substantially flexible substrate 131, as shown. Preferably, the substantially flexible substrate 131 comprises at least one nonconductive material. Preferably, flexible substrate 131 supports an upper electric wire 242 and a lower electric wire 244 in generally parallel arrangement, as shown (at least embodying herein wherein such at least one electrifiable ribbon comprises at least one first such at least one electrical conductor and at least one second such at least one electrical conductor). Preferably, the upper electric wire 242 and a lower electric wire 244 are both positioned on electrified side 125, and are electrically isolated from safety-side 127 by the nonconductive material of flexible substrate 131, as shown. Upon reading the teachings of this specification, those of ordinary skill in the art will now understand that, under appropriate circumstances, considering such issues as intended use, cost, advances in technology, etc., other conductor arrangements, such as bare wires, cables, multiple ribbons, etc., may suffice.

Preferably, the reel assembly 218 of FIG. 7 comprises a center axle 230 having two semi-circular portions 232 and 234. Preferably, portion 232 supports an upper contact 236, preferably a conductive material, and a lower contact 238, preferably a conductive material, situate as shown, such that electrifiable ribbon 124, comprising the previously described upper electric wire 242 and lower electric wire 244, may be coupled to a respective upper contact 236 and lower contact 238. Preferably, a first end of the electrified ribbon 124 is placed along the center axle 230 such that the upper electric wire 242 and a lower electric wire 244 may be coupled to a respective upper contact 236 and lower contact 238 and then clamped onto the center axle 230 by clamping together semi-circular portions 232 and 234, preferably with screws 246, as shown 9 at least embodying herein wherein such at least one first end comprises at least one first coupler structured and arranged to electrically couple such at least one electrical conductor to such at least one self-contained power source). Upon reading the teachings of this specification, those with ordinary skill in the art will now understand that, under appropriate circumstances, considering such issues as electrifiable ribbon thickness and economical considerations, etc., other methods of coupling the electrifiable ribbon to the post assembly, such as bolt-on, grooves, wire, tension bands, adhesive, etc., may suffice.

Preferably, the upper contact 236 extends through the top 248 of the reel assembly 218 just enough to come into contact with conducting stator 220, as shown. Preferably, lower contact 238 extends through the bottom 250 of the reel assembly 218 just enough to come into contact with conducting stator 216, as shown. Preferably, center axle 230 has an upper extension 252, preferably comprising a rotating bearing 254 that rests within cap 222, as shown. Most preferably, the reel assembly 218 rotates freely while being held in a relatively stable longitudinal axis by the cap 222.

Preferably, center axle 230 has a lower extension 256, comprising a slotted spring engager 258, as shown. Preferably, the slotted spring engager 258 engages the end tongue 260 of spring mechanism 212, as shown. Preferably, the spring mechanism 212 provides tension such that the reel assembly 218 will rewind when not being held, for example when the electrified ribbon 124 is released from coupling to another post assembly 102.

Preferably, as described above, an electric current may be transferred through the respective first stator 216 and second stator 220 to the respective upper contact 236 and lower contact 238 and to the respective upper electric wire 242 and lower electric wire 244, as shown. Preferably, first stator 216 and second stator 220 are electrically coupled to self-contained power source 215 by means of internal supply circuits 223, as shown.

Preferably, the components, as described above, of the retractable electrified ribbon reel system 210 nest together within the post assembly 102, as shown. Most preferably, they nest within a compartmented retractable electrified ribbon reel portion 270. In such manner, those with ordinary skill in the art, upon reading the teachings of this specification, will now understand without undue experimentation, how the retractable electrified ribbon reel system 210 is coupled to the power source 140 to provide a retractable electrified ribbon 124 and deployable boundary member 110. Upon reading the teachings of this specification, those with ordinary skill in the art will now understand that, under appropriate circumstances, considering such issues as economic considerations, marketing considerations and user preferences, etc., other methods of providing a deployable boundary member, such as fabric or plastic deployable boundary members, etc., may suffice.

In an alternate preferred embodiment of the compartmented retractable electrified ribbon reel portion 270, the operation of the post assembly 102 is enabled by integrating a commercially-available electrical cable reel into the post structure. Such cable reels are generally used to store electrical extension cords and drop-light cables. Preferably, such preferred cable reels comprise a positive latching mechanism to allow the deployable boundary member to be extended to any length required and held in place. Preferably, a pull on the deployable boundary member initiates the spring-powered retraction of the deployable boundary member into the reel housing. Such preferred reels include an internal commutator adapted to maintain a continuous electrical circuit at the deployable boundary member during operation of the reel. Preferably, a single self-contained power source 215, preferably located within the post, can be used to energize one or more reels. Construction of key portions of such a cable reel are generally illustrated in Applicant's U.S. Pat. No. 7,101,186.

Reference is now made to FIG. 8A and FIG. 8B with continued reference to the above Figures. FIG. 8A shows a perspective view, partially in section, of a post assembly 102 to post assembly 102 coupling according to a preferred embodiment of the present invention. FIG. 8B shows a sectional view through the section 8B-8B of FIG. 8A. Preferably, as previously described in reference to FIG. 4, coupling tabs 162 will slidably fit into receiving coupling slots 166, such as located on the floor-mount posts 106, as shown.

Figure 9:
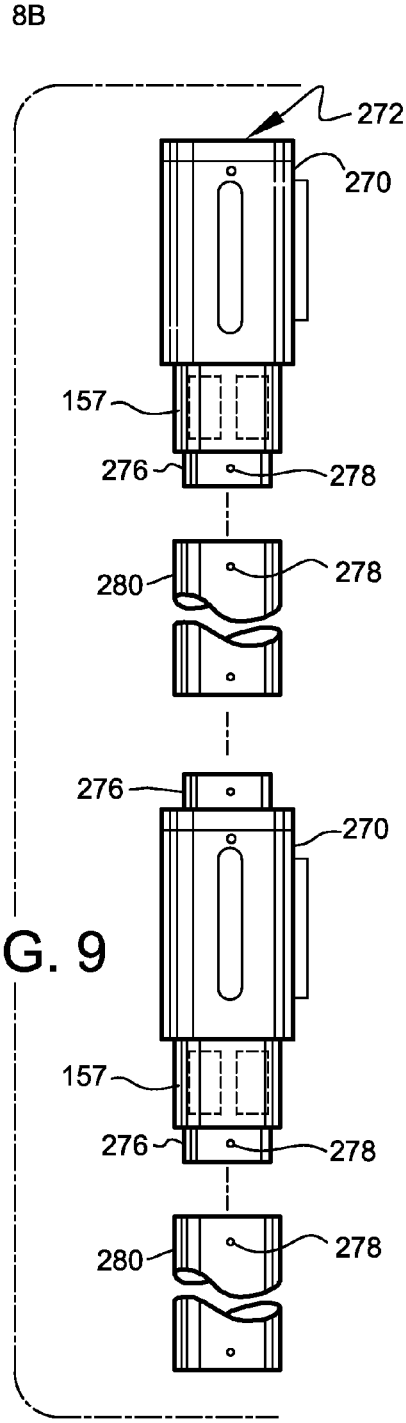
FIG. 9 shows a partial side view, of the post assembly of FIG. 1

FIG. 9 shows a partial side view of the post assembly 102 according to the post assembly of FIG. 1. Preferably, the electric post assemblies 102 may be assembled using compartmented retractable electrified ribbon reel portions 270, as shown. In such manner, the user or manufacturer may determine whether to utilize one or multiple deployable boundary member portions such as the two-rail portion described above using upper electrified ribbon reel portions 156 and 158.

Preferably, each compartmented retractable electrified ribbon reel portion 270 is energized by a dedicated self-contained power source 215 located within an electric power compartment 157, as shown. Alternately preferably, each compartmented retractable electrified ribbon reel portion 270 is energized by a single common self-contained power source 215 located within a single electric power compartment 157. Alternately preferably, only one of the two compartmented retractable electrified ribbon reel portions 270 is energized by a dedicated self-contained power source 215 located within an electric power compartment 157.

Preferably, compartmented retractable electrified ribbon reel portion 270 would come in end pieces 272 or center pieces 274, as shown. Preferably, connector portions 276 would be attached at or on both ends of the compartmented retractable electrified ribbon reel portion 270, as shown. Preferably, such connector portions 276 preferably comprise standardized sizes to enable system modularity, as shown. Preferably, spacer portions 280 would be attached in between such electrified ribbon reel portion 270, as shown. Preferably, the connector portions 276 are secured to the spacer portions 280 by screws (not shown) in aligned apertures 278 (when the portions are connected). Furthermore, those with ordinary skill in the art, upon reading the teachings of this specification, will appreciate that, under appropriate circumstances, considering such issues as animal height and user preferences, etc., other methods of choosing electrified ribbon reel portions, such as manufacturing multiple styles, etc., may suffice.

FIG. 10 shows a sectional view through the section 10-10 of FIG. 5 illustrating the preferred coupling arrangements of the electric post assemblies 102.

FIG. 11A shows a schematic diagram of the deployable boundary member and self-contained power source 215 according to the trailer enclosure system of FIG. 1. Preferably, self-contained power source 215 functions to produce a high voltage pulse used to energize its respective electrified ribbon 124, as shown. Preferably, self-contained power source 215 comprises one or more primary or secondary batteries 300 electrically coupled to control circuit 302 and step-up transformer 304, as shown.

Preferably, batteries 300 comprise one or more flashlight-type batteries, such as, for example C-type cells or D-type cells, as shown. Upon reading the teachings of this specification, those of ordinary skill in the art will now understand that, under appropriate circumstances, considering such issues as intended use, cost, etc., other power arrangements, such as AC transformers, solar cells, lantern batteries, etc., may suffice.

Power control circuit 302 preferably comprises a solid-state pulse circuit, preferably adapted to generate several hundred volts from the low-voltage current supplied by batteries 300. This higher voltage may be used to charge, for example, a storage capacitor that is preferably circuited to periodically discharge through the primary windings 306 of the step-up transformer 304, as shown. Such a discharge through the primary windings 306 preferably induces a high-voltage in the secondary windings 308 that is preferably output to commutator assembly 213, as shown. Commutator assembly 213 is preferably coupled to electrified ribbon 124, as previously described. A user controllable switch 310 may be included in the circuit to control the operation of power control circuit 302, as shown.

Alternately, those skilled in the art will now appreciate that control circuit 302 may preferably comprise an electromechanical spark coil as a preferred substitute to the above-described solid-state device. Such a circuit would preferably comprise a set of mechanical contacts in combination with a coil. Upon reading the teachings of this specification, those of ordinary skill in the art will now understand that, under appropriate circumstances, considering such issues as intended use, cost, advances in technology, etc., other circuiting arrangements, such as the use of high-powered transistors, automotive-type spark coils, flyback transformers, solid-state switches, sensing circuits, fuses, battery saving/charging circuits, etc., may suffice.

Preferably, upper electric wire 242 is coupled to at least one positive electrical potential of self-contained power source 215 and lower electric wire 244 is coupled to at least one negative electrical potential of self-contained power source 215, as shown. Preferably, upper electric wire 242 and lower electric wire 244 are electrically isolated and normally comprise an open circuit, as shown. Preferably, contact between the upper electric wire 242 and the lower electric wire 244 by the animal closes the circuit thus delivering a brief "jolt" of electric current used to deter the animal from crossing the deployable boundary member 110.

FIG. 11B shows a sectional view through the section 11B-11B of FIG. 11A showing a preferred arrangements of the electrified ribbon 124. Preferably, FIG. 12 shows a top view of the alternate trailer enclosure system 500 according to a preferred embodiment of the present invention. Preferably, the trailer enclosure system 500 comprises a set of post assemblies 502 (at least embodying herein polygon fence means, having a plurality of electrifiable sides, for restraining the at least one animal; and at least embodying herein at least one polygon fence, having a plurality of electrifiable sides, structured and arranged to restrain the at least one animal) preferably including wall mount posts 504, floor-mount posts 506 and interconnecting rails 508, most preferably deployable boundary members 510, (including a power source 540) as shown. Preferably, the floor-mount post 506 comprises an outer construction substantially similar to that of the floor-mount post 506. Preferably, the wall mount posts 504 are attached to one side wall 116 of the trailer 112 in a manner substantially similar to that of the wall mount posts 104 (this arrangement at least embodies herein wherein such at least one of such plurality of electrifiable sides of such polygon fence means are structured and arranged to abut the at least one side wall; and it at least embodies herein wherein such at least one of such plurality of electrifiable sides of such at least one polygon fence are structured and arranged to abut the at least one side wall), such as the horse trailer 114 illustrated in FIG. 1. Preferably, such horse trailers 114 are fully enclosed or have at least four sides, as shown (at least embodying herein animal transport means, having at least one side wall, for transporting the at least one animal; and at least embodying herein at least one animal transport, having at least one side wall for transporting the at least one animal).

Preferably, the post assemblies 502 can be interconnected to create a single enclosure or, divided into multiple areas 532 and 534, as shown. As in the prior embodiment, preferably, the wall mount posts 504 are permanently attached to the trailer side wall 116, as shown. Preferably, the floor-mount posts 506 are held to the ground or floor surface (asphalt, dirt, etc.) by temporary means only.

Preferably, the trailer enclosure system 500 comprises a single common power source 540, preferably a battery 542, preferably twelve-volt, preferably located within the trailer 112 or from a power extension 544 connected to a power source such as a trailer-pulling vehicle or generator.

Preferably, the power source 540 is coupled to a power controller 546, as shown. Preferably, power controller 546 functions to produce a high voltage pulse used to energize the post assemblies 502 and is substantially similar in concept to the diagram of FIG. 11A.

Preferably, power controller 546 is preferably coupled through power conductors 548, which preferably run from the power source 540 to the power controller 546 and to the deployable boundary members 510 (at least embodying herein wherein such conductor means comprises at least one ribbon portion and at least embodying herein wherein such at least one conductor comprises at least one ribbon portion), as shown. Preferably, the power controller 546 provides a user with controls to adjust the voltage/amperage of the deployable boundary members 510 and provides a fuse mechanism to protect the animals. Preferably, the power controller is coupled to the wall mount posts 504, preferably through power conductors 550, as shown. Preferably, the power controller 546 further comprises an exterior mounted on/off switch 552, as shown. Upon reading the teachings of this specification, those with ordinary skill in the art will now understand that, under appropriate circumstances, considering such issues as economics and user preferences, etc., other methods of controlling the voltage/amperage, such as in-line controllers, etc., may suffice. Furthermore, those with ordinary skill in the art, upon reading the teachings of this specification, will appreciate that, under appropriate circumstances, considering such issues as electrical code requirements and safety, etc., other methods of switching and power transfer, etc., may suffice.

FIG. 13 shows a side view, partially in section, of the alternate post assembly 502 according to another preferred embodiment of FIG. 12. Preferably, the post assemblies 502 may be assembled using compartmented retractable electrified ribbon reel portions 570, as shown. In such manner, the user or manufacturer may determine whether to utilize one or multiple deployable boundary member portions. Preferably, compartmented retractable electrified ribbon reel portion 670 would come in end pieces 572 or center pieces 574, as shown. Preferably, connector portions 576, preferably of standardized sizes, would be attached at or on both ends of the compartmented retractable electrified ribbon reel portion 670, as shown. Preferably, spacer portions 580 would be attached in between such electrified ribbon reel portion 670, as shown.

Figure 14:
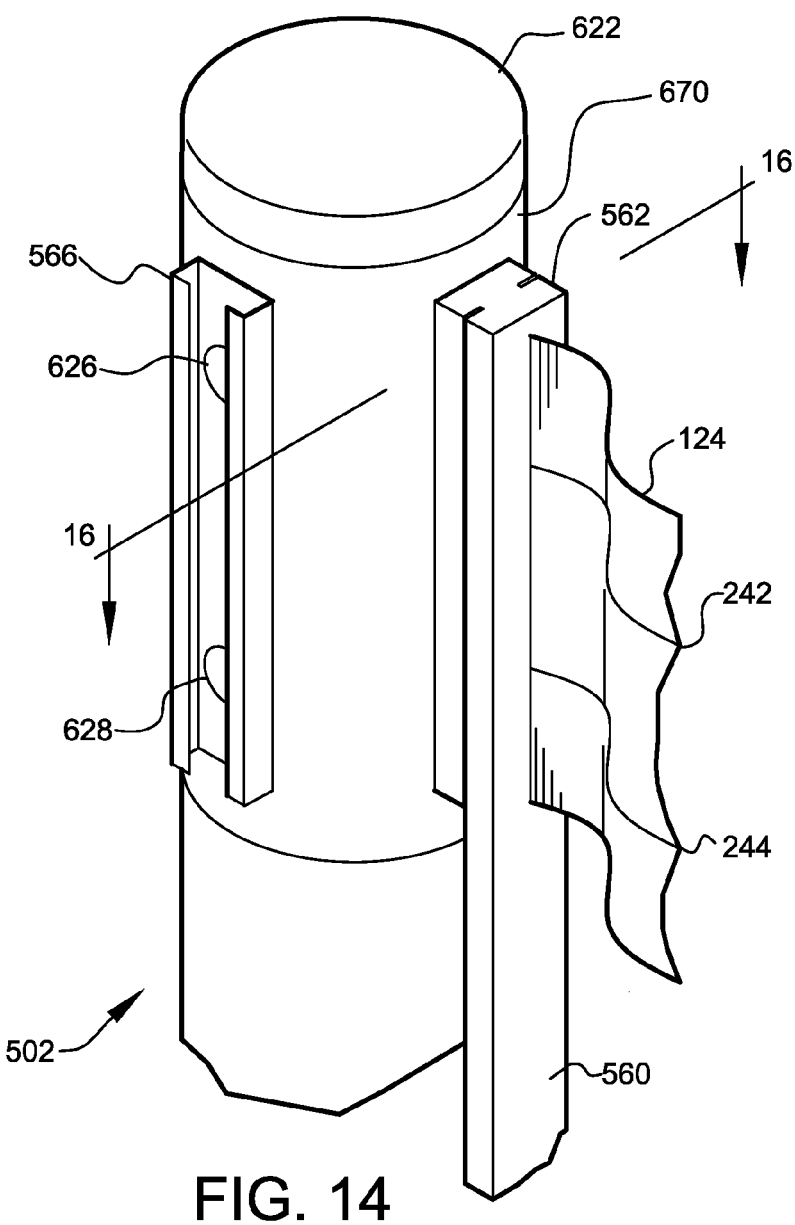
FIG. 14 shows a partial perspective view, of a post-assembly-to-post-assembly coupling according to the preferred embodiment of FIG. 12.

FIG. 14 shows a partial perspective view, of a post-assembly-to-post-assembly coupling according to the preferred embodiment of FIG. 12. FIG. 15 shows a sectional top view through the section 15-15 of FIG. 14.

Preferably, the coupling bar 560 of the trailer enclosure system 500 assists a user in pulling out the retractable electrified ribbon 524 and in coupling the retractable electrified ribbon 524 (at least embodying herein at least one electrified fence rail portion) to another post assembly 502 (this arrangement at least embodying herein wherein such at least one first post comprises at least one first coupler adapted to couple such at least one electrified fence rail portion to such at least one second post). Preferably, the coupling bar 560 comprises an upper tab 562 and a lower tab 564 which will slidably fit into preferably-matching upper receiving coupling slot 566 and lower receiving coupling slot 568, preferably located on the floor-mount posts 506.

Preferably, each respective upper tab 562 and lower tab 564 further comprises electrical contact points 570 and 572 that will match-up with electrical contact points 574 and 576 (respectively) on matching receiving slot 566 and receiving slot 568, as shown. In such manner, when then upper tab 562 and lower tab 564 are coupled to the matching upper receiving coupling slot 566 and lower receiving coupling slot 568, the power source 540 is transferred from one post assembly 502 (embodying herein at least one first post) to another post assembly 502 (at least embodying herein at least one second post), as shown. This arrangement at least embodies herein wherein such at least one first coupler comprises at least one second coupler structured and arranged to electrically couple such at least one first portion of the at least one electrified fence rail portion to at least one second post. In such manner, as described above, multiple post assemblies may be connected to form an enclosure and to provide a deployable boundary member 510 between each post assembly 502. This arrangement at least embodies herein whereby a plurality of such at least one electrified fence rail portions may be coupled together and stably supported by such at least one first post and such at least one second post.

Upon reading the teachings of this specification, those with ordinary skill in the art will now understand that, under appropriate circumstances, considering such issues as enclosure height and animal size, etc., more or less than two electrified ribbon portions, etc., may suffice.

Figure 16:
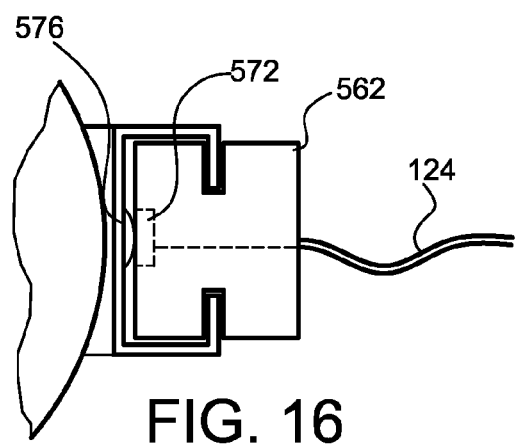
FIG. 16 shows a sectional view through the section 16-16 of FIG. 14.

FIG. 16 shows a sectional view through the section 16-16 of FIG. 14. Preferably, as previously described in reference to FIG. 14, coupling tabs 562 will slidably fit into receiving coupling slots 566, such as located on the floor-mount posts 506, as shown. Preferably, each respective tab 562 comprises electrical contact points 570 and 572 that will match-up with respective electrical contact points 574 and 576 on the receiving coupling slot 566, as shown. In such manner, when then coupling bar 560 is coupled to the receiving coupling slots 566, the power source is transferred from one post assembly 502 to another post assembly 502, as shown.

Figure 17:
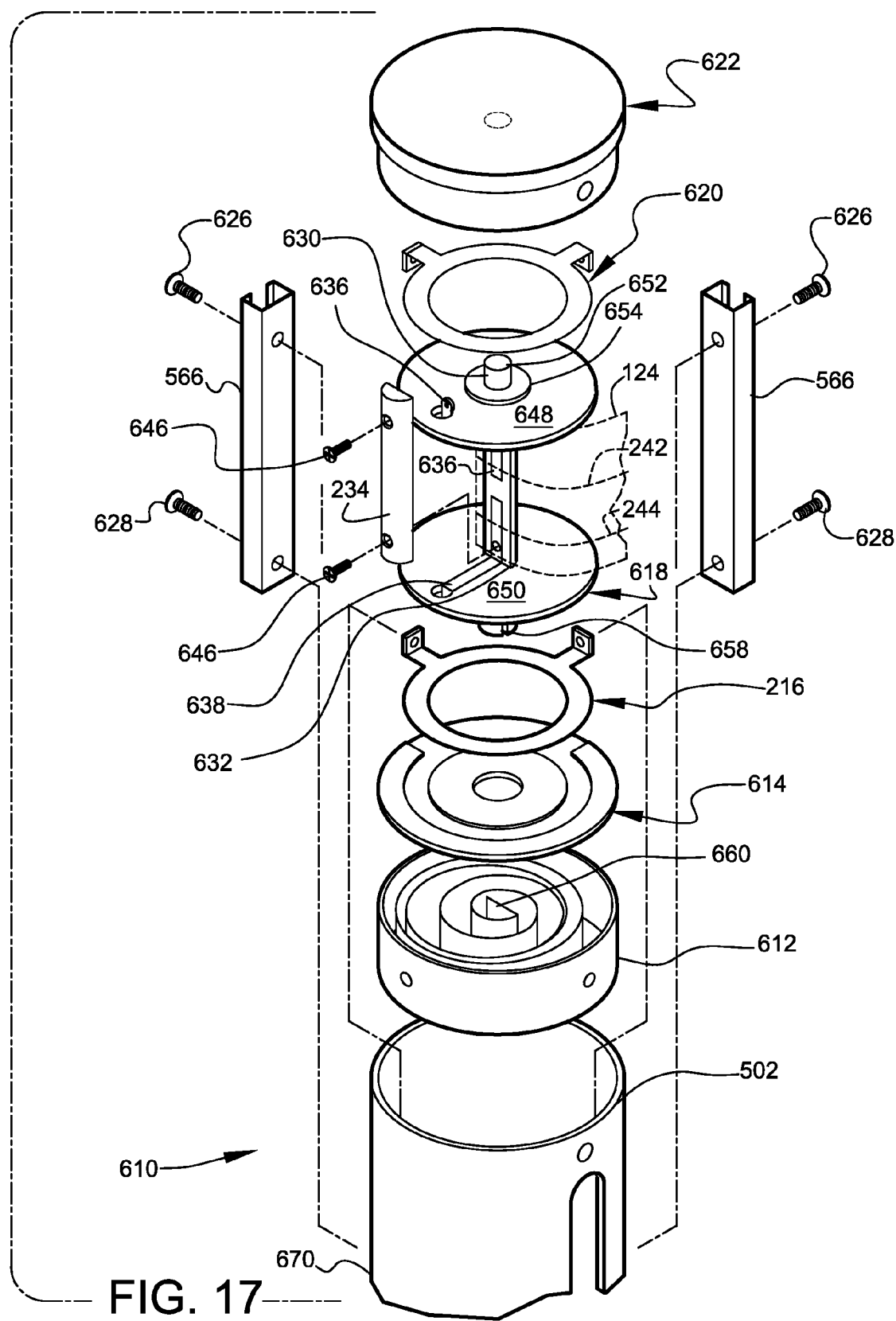
FIG. 17 shows an exploded perspective view, partially in section, of the alternate trailer enclosure system.

FIG. 17 shows an exploded perspective view, partially in section, of the retractable electrified ribbon reel system 610 shown as upper electrified ribbon reel portions 556 and lower electrified ribbon reel portions 558 of the post assemblies 502 of FIG. 13 and FIG. 14. Preferably, the retractable electrified ribbon reel system 610 is situate within the post assemblies 502 as discussed above (at least embodying herein wherein such reel means comprises post means for assisting stable support of such plurality of electrifiable sides and at least embodying herein wherein such at least one reel comprises at least one post structured and arranged to assist stable support of such plurality of electrifiable sides). Preferably, the retractable electrified ribbon reel system 610 comprises a spring mechanism 612, a combined spring and stator retainer 614, a first stator 616, a reel assembly 618, a second stator 620, a cap 622, two upper receiving coupling slot 566 and two sets of electrical contact screws 626 and 628, as shown.

Preferably, the reel assembly 618 comprises a center axle 630 having two semi-circular portions 632 and 634. Preferably, portion 632 comprises an upper contact 636, preferably copper and a lower contact 638, preferably copper, situate as shown, such that electrified ribbon 124 with an upper electric wire 242 and a lower electric wire 244 may be coupled to a respective upper contact 636 and lower contact 638. Preferably, the electrified ribbon 124 is placed along the center axle 630 such that the upper electric wire 242 and a lower electric wire 244 may be coupled to a respective upper contact 636 and lower contact 638 and then clamped onto the center axle 630 by clamping together semi-circular portions 632 and 634, preferably with screws 646, as shown. Upon reading the teachings of this specification, those with ordinary skill in the art will now understand that, under appropriate circumstances, considering such issues as electrifiable ribbon thickness and economical considerations, etc., other methods of coupling the electrified ribbon to the post assembly, such as bolt-on, grooves, wire, tension bands, adhesive, etc., may suffice.

Preferably, the upper contact 636 extends through the top 648 of the reel assembly 618 just enough to come into contact with conducting stator 620, as shown. Preferably, lower contact 638 extends through the bottom 650 of the reel assembly 618 just enough to come into contact with conducting stator 616, as shown. Preferably, center axle 630 has an upper extension 652, preferably comprising a rotating bearing 654 that rests within cap 622, as shown. Most preferably, the reel assembly 618 rotates freely while being held in a relatively stable longitudinal axis by the cap 622.

Preferably, center axle 630 has a lower extension 656, comprising a slotted spring engager 658, as shown. Preferably, the slotted spring engager 658 engages the end tongue 660 of spring mechanism 612, as shown. Preferably, the spring mechanism 612 provides tension such that the reel assembly 618 will rewind when not being held, for example when the electrifiable ribbon 636 is released from coupling to another post assembly 502.

Preferably, as described above, an electric current may be transferred through the respective contact screws 626 and 628 to the respective first stator 616 and second stator 620 to the respective upper contact 636 and lower contact 638 and to the respective upper electric wire 242 and lower electric wire 244, as shown.

Preferably, the components, as described above, of the retractable electrified ribbon reel system 610 nest together within the post assembly 502, as shown. Most preferably, they nest within a compartmented retractable electrified ribbon reel portion 670. In such manner, those with ordinary skill in the art, upon reading the teachings of this specification, will now understand without undue experimentation, how the retractable electrified ribbon reel system 610 is coupled to the power source 540 to provide a retractable electrified ribbon 124 and deployable boundary member 510. Upon reading the teachings of this specification, those with ordinary skill in the art will now understand that, under appropriate circumstances, considering such issues as economic considerations, marketing considerations and user preferences, etc., other methods of providing an deployable boundary member, such as fabric or plastic deployable boundary members, etc., may suffice.

Although applicant has described applicant's preferred embodiments of this invention, it will be understood that the broadest scope of this invention includes such modifications as diverse shapes and sizes and materials. Such scope is limited only by the below claims as read in connection with the above specification.

Further, many other advantages of applicant's invention will be apparent to those skilled in the art from the above descriptions and the below claims.

What is claimed is:

1. A polygon restraint enclosure system, relating to the restraint of at least one animal within at least one temporary holding area having at least one ground surface, said system comprising:

a) at least one deployable boundary member structured and arranged to temporarily enclose at least one open boundary of the at least one temporary holding area;

b) at least one support post structured and arranged to assist temporary stable support of said at least one deployable boundary member above the at least one ground surface;

c) at least one self-contained power source structured and arranged to provide at least one electric current sufficient to assist restraint of the at least one animal;

d) wherein said at least one self-contained power source is located substantially within said at least one support post;

e) wherein said at least one deployable boundary member comprises at least one electrical conductor structured and arranged to conduct the at least one electric current substantially along at least one deployed length of said at least one boundary member;

f) wherein said at least one electrical conductor comprises at least one open circuit structured and arranged to be at least partially exposed to the at least one holding area;

g) wherein contact between the at least one animal and said at least one electrical conductor closes said at least one open circuit passing the at least one electric current to the at least one animal; and h) wherein said at least one support post comprises at least one storage structured and arranged to store said at least one deployable boundary member substantially within said at least one support post when not in use; i) wherein said at least one deployable boundary member comprises at least one electrifiable ribbon comprising at least one first ribbon side and at least one second ribbon side; j) wherein said at least one electrifiable ribbon comprises at least one first said at least one electrical conductor and at least one second said at least one electrical conductor; k) wherein said at least one first said at least one electrical conductor and said at least one second said at least one electrical conductor run substantially parallel to one another along said at least one second ribbon side; l) wherein said at least one first said at least one electrical conductor is coupled to at least one positive electrical potential of said at least one self-contained power source; and m) wherein said at least one second said at least one electrical conductor is coupled to at least one negative electrical potential of said at least one self-contained power source.

2. The polygon restraint enclosure system according to claim 1 wherein said at least one support post is movably relocatable relative to the at least one ground surface.

3. The polygon restraint enclosure system according to claim 2 wherein:
   a) said at least one electrical conductor comprises at least one substantially flexible composition; and
   b) said at least one deployable boundary member comprises at least one substantially flexible substrate structured and arranged to position said at least one electrical conductor along said at least one deployable boundary member.

4. The polygon restraint enclosure system according to claim 3 wherein said at least one support post comprises at least one retractor reel structured and arranged to assist retractable reeling of said at least one deployable boundary member to at least one stowed position within said at least one storage.

5. The polygon restraint enclosure system according to claim 3 wherein:
   a) said at least one deployable boundary member comprises at least one first end and at least one second end;
   b) said at least one first end comprises at least one first coupler structured and arranged to electrically couple said at least one electrical conductor to said at least one self-contained power source; and
   c) said at least one second end comprises at least one second coupler structured and arranged to couple said at least one deployable boundary member to at least one attachment point.

6. The polygon restraint enclosure system according to claim 5 wherein said at least one first coupler comprises at least one commutator structured and arranged to maintain the electrical coupling of said at least one electrical conductor and said at least one self-contained power source during operation of said at least one retractor reel.

7. The polygon restraint enclosure system according to claim 5 further comprising:
   a) a plurality of said at least one support posts;
   b) wherein said at least one second coupler is structured and arranged to couple at least one first support post of said plurality to at least one second support post of said plurality.

8. The polygon restraint enclosure system according to claim 7 further comprising:
   a) at least one animal transport structured and arranged to transport the at least one animal;
   b) wherein said at least one animal transport comprises at least one sidewall usable to define at least one boundary of the at least one temporary holding area.

9. The polygon restraint enclosure system according to claim 8 wherein at least one said at least one support post of said plurality comprises at least one wall mount structured and arranged to mount said at least one support post to said at least one sidewall.

10. The polygon restraint enclosure system according to claim 9 wherein said at least one animal transport comprises at least one secondary power source structured and arranged to power at least one electrical conductor of at least one said at least one support post of said plurality.

11. The polygon restraint enclosure system according to claim 9 wherein said at least one animal transport comprises at least one carrier structured and arranged to carry said plurality of said at least one support posts when not in use.

12. A polygon restraint enclosure system, relating to restraining at least one animal within at least one enclosure having a plurality of enclosure sides, after being transported by at least one animal transport having at least one sidewall, comprising:
   a) at least one animal transport structured and arranged to transport the at least one animal
   b) deployable from said at least one animal transport, at least one electrifiable polygon fence structured and arranged to restrain the at least one animal; and
   c) at least one power source structured and arranged to provide a sufficiently high voltage to said electrifiable polygon fence to assist restraint of the at least one animal;
   d) wherein said electrifiable polygon fence comprises at least one conductor structured and arranged to transmit such voltage;
   e) wherein said at least one conductor comprises at least one electrifiable ribbon comprising at least one first ribbon side and at least one second ribbon side; f) wherein said at least one electrifiable ribbon comprises at least one first at least one electrical conductor and at least one second at least one electrical conductor; g) wherein said at least one first said at least one electrical conductor and said at least one second said at least one electrical conductor run substantially parallel to one another along said at least one second ribbon side; h) wherein said at least one first said at least one electrical conductor is coupled to at least one positive electrical potential of said at least one power source; i) wherein said at least one second said at least one electrical conductor is coupled to at least one negative electrical potential of said at least one power source;
   j) wherein at least one side of said at least one electrifiable polygon fence is structured and arranged to abut at least one sidewall of said at least one animal transport;
   k) wherein said at least one electrifiable polygon fence comprises at least one post structured and arranged to assist stable support of said electrifiable polygon fence; and
   l) wherein said at least one post comprises at least one reel structured and arranged to assist retractable storing of said at least one conductor inside at least one portion of said at least one post.

13. The polygon restraint enclosure system according to claim 12 wherein said at least one power source is located substantially within said at least one animal transport.

14. The polygon restraint enclosure system according to claim 13 wherein said at least one animal transport comprises at least one carrier structured and arranged to carry said at least one polygon fence when not in use.

15. The polygon restraint enclosure system according to claim 13 wherein said at least one power source comprises at least one battery-powered direct-current circuit structured and arranged to generate at least one high-voltage low-amperage current.

* * * * *